(No Model.)
J. H. BULLARD.
CALIPERS.
No. 335,740. Patented Feb. 9, 1886.
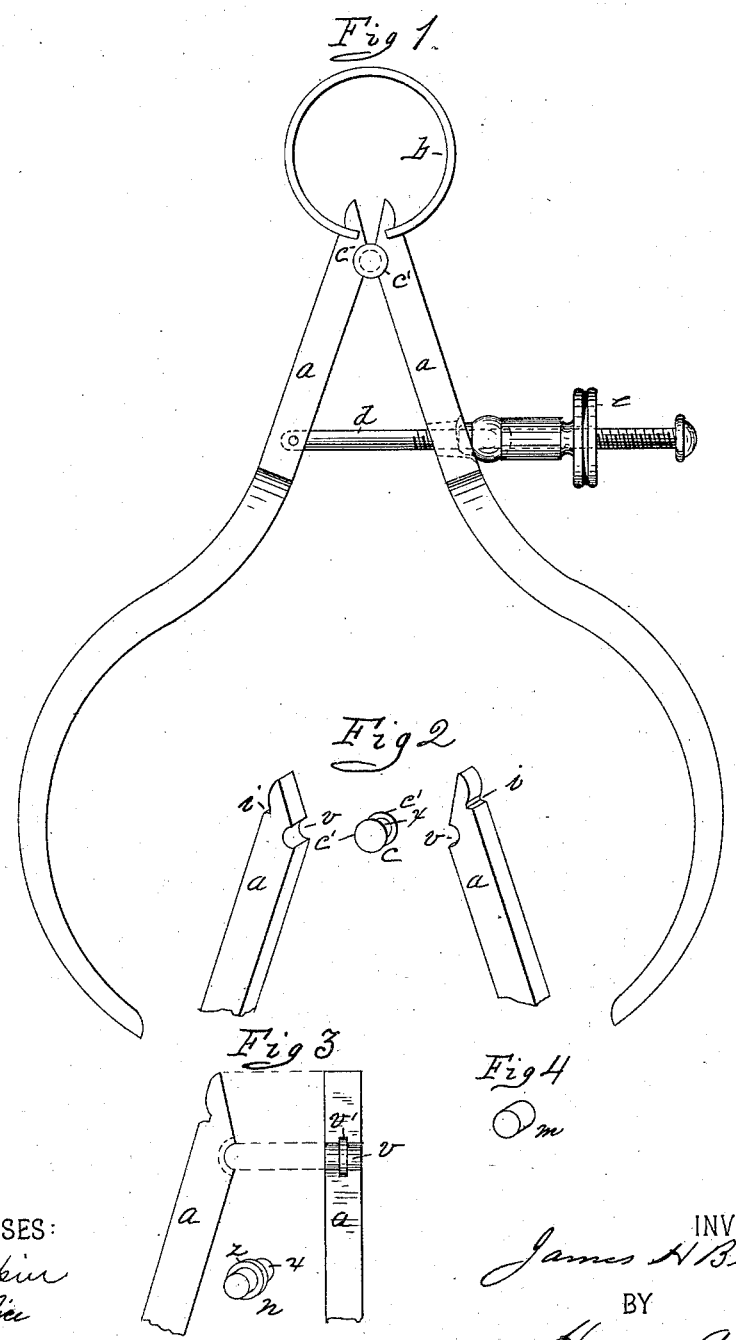
WITNESSES:
INVENTOR
James H Bullard
BY
Henry A Chapin
ATTORNEY

UNITED STATES PATENT OFFICE.

JAMES H. BULLARD, OF SPRINGFIELD, MASSACHUSETTS, ASSIGNOR TO CHARLES P. FAY, OF SAME PLACE.

CALIPERS.

SPECIFICATION forming part of Letters Patent No. 335,740, dated February 9, 1886.

Application filed September 21, 1885. Serial No. 177,640. (No model.)

*To all whom it may concern:*

Be it known that I, JAMES H. BULLARD, a citizen of the United States, residing at Springfield, in the county of Hampden and State of Massachusetts, have invented new and useful Improvements in Calipers, of which the following is a specification.

This invention relates to improvements in calipers and similar instruments, and is in the nature of an improvement upon Patent No. 319,215, dated June 2, 1885, the object being to provide an improved fulcrum-bearing for calipers, dividers, and analogous instruments which embody the general construction shown and described in said patent, to which reference may be had.

In the drawings forming part of this specification, Figure 1 illustrates in side elevation a pair of calipers having a fulcrum-bearing embodying my invention. Fig. 2 is a perspective view of those parts of the legs of the calipers in which the fulcrum-bearings are formed and of the fulcrum-pin. Fig. 3 is a view of those parts of the legs which are shown in Fig. 2, the outer side of one being shown and the fulcrum-bearing side of the other, and in said figure is also illustrated in perspective view a modified form of fulcrum-pin, the fulcrum-sockets in the leg parts in this figure being adapted to receive said modified pin. Fig. 4 illustrates a second modified form of fulcrum-pin.

In the drawings, $a$ $a$ are the legs of the calipers, and $b$ is the spring engaging with the outer sides of said legs in the notches $i$ above the fulcrum-bearings $v$. The spring $b$ is of substantially the form shown in said patent, having notches or slots in its ends to fit in or engage with the notches $i$ in the legs. The screw-rod $d$ is of the usual construction, passing through one leg and pivoted to the other, and provided with the leg-adjusting nut $e$.

In said patent one of the legs of the calipers is made with a depressed curved-faced fulcrum-bearing, substantially like the bearing $v$ in Fig. 2, and the other has a laterally-projecting short arm or bearing fitting into said depression in the first-named leg and constituting the fulcrum-point of the legs.

In practice it is inconvenient to make the fulcrum-bearings on the two legs of the calipers of different forms, as in said patent, for more tools and more labor are required therefor, and to obviate said inconvenience and to make the implement in the most economical manner my improved fulcrum-bearing is constructed as follows:

In the inner opposite sides of the legs $a$ are formed two transverse curved-face grooves, $v$ $v$, one in each leg. A cylindrical pin, $c$, is then provided, which fits into said grooves $v$, each end thereof having the head or flange $c'$ thereon, of greater diameter than the body $x$ of the pin, and the length of the latter between said heads is equal to the thickness of the legs $a$, measuring through the groove $v$ from one end to the other of the latter, so that when the said legs are brought together upon said pin $c$, as in Fig. 1, the latter lying in said grooves, the heads $c'$ project laterally beyond the pin proper, and their inner opposite faces have such a bearing on the sides of the legs that the pin can have no endwise movement between the latter. The depth of the grooves $v$ is such that the inner opposite sides of the legs are prevented from meeting, as shown in Fig. 1, and hence they are free to vibrate with the pin for their fulcrum-point.

With a loose or detached fulcrum-pin as above described for use between the grooved legs of the calipers it is preferable that means be provided in the construction of the pin or in the latter and the legs combined, as shown in Fig. 3, whereby the pin is prevented from having any endwise movement between the legs, but the prevention of said endwise movement is not essential to the proper operation of the calipers, for said pin is held very firmly between the legs thereof by the action of spring $b$, when the nut $e$ is screwed against one of the legs, as in Fig. 1, and is not easily displaced. Therefore, if desired, the cylindrical parallel-sided pin $m$ (shown in Fig. 4) may be used in place of the pin $c$, and if it be found desirable to use a pin without the laterally-projecting flanges or heads of the latter, but possessing means for preventing said endwise movement, then the pin $n$ (shown in Fig. 3) may be used, and the grooves in the legs be formed to correspond therewith. Said pin $n$ is made with a collar, $z$, around it, centrally between the ends thereof, its body $x$ being otherwise of plain cylindrical form, and the grooves $v$ in the legs $a$ have a cross-groove, $v'$, therein to receive the collar $z$, so that when the legs are closed upon the pin $n$ it can have no endwise movement therebetween.

What I claim as my invention is—

1. In calipers or similar implement, the combination of two legs having each a transverse groove in its inner side, a fulcrum-pin fitting in said grooves, and a curved spring having notches in its ends engaging with notches in the outer sides of the legs, substantially as set forth.

2. In calipers or similar implement, the combination of two legs having each a transverse groove in its inner side, a curved spring having notches in its ends engaging with notches in the legs, a pin fitting in said grooves in the latter, and means, substantially as described, for preventing endwise movement of said pin, all as set forth.

3. In calipers or similar implement, the combination of two legs having each a transverse groove in its inner side, a curved spring having notches in its ends engaging with notches in the outer sides of the legs, and a pin fitting in said grooves in the legs having laterally-projecting heads thereon, substantially as set forth.

JAMES H. BULLARD.

Witnesses:
H. A. CHAPIN,
WM. H. CHAPIN.